United States Patent [19]

Koshiishi

[11] Patent Number: 4,615,598

[45] Date of Patent: Oct. 7, 1986

[54] METHOD OF EXTRACTING AUTOMATIC-FOCUSING INFORMATION

[76] Inventor: Shinichirou Koshiishi, 7-8-547 Higashihirayama 1-chome, Hino-shi, Tokyo, Japan

[21] Appl. No.: 745,298

[22] Filed: Jun. 14, 1985

[30] Foreign Application Priority Data

Jun. 20, 1984 [JP] Japan ................................ 59-126817

[51] Int. Cl.⁴ .......................... G03B 3/00; H04N 5/38
[52] U.S. Cl. ..................................... 354/402; 358/227
[58] Field of Search ....................... 354/402; 358/227; 250/201, 578

[56] References Cited

U.S. PATENT DOCUMENTS 3,967,056  6/1976  Yata et al. ...................... 354/402 X
4,422,097 12/1983  Inuiya ............................. 354/402 X
4,500,925  2/1985  Hamma et al. ...................... 358/227

Primary Examiner—William B. Perkey

[57] ABSTRACT

At least a portion of one line of an output signal from an image pickup device is stored in a delay line, and maximum and minimum values of the output signal are detected. Then, a coefficient is computed for shifting the minimum value to a least significant bit in an A/D converter and the maximum value to a most significant bit in the A/D converter. The stored signal is read out of the delay line, amplified by the coefficient, and converted to a digital signal representative of automatic-focusing information.

8 Claims, 5 Drawing Figures

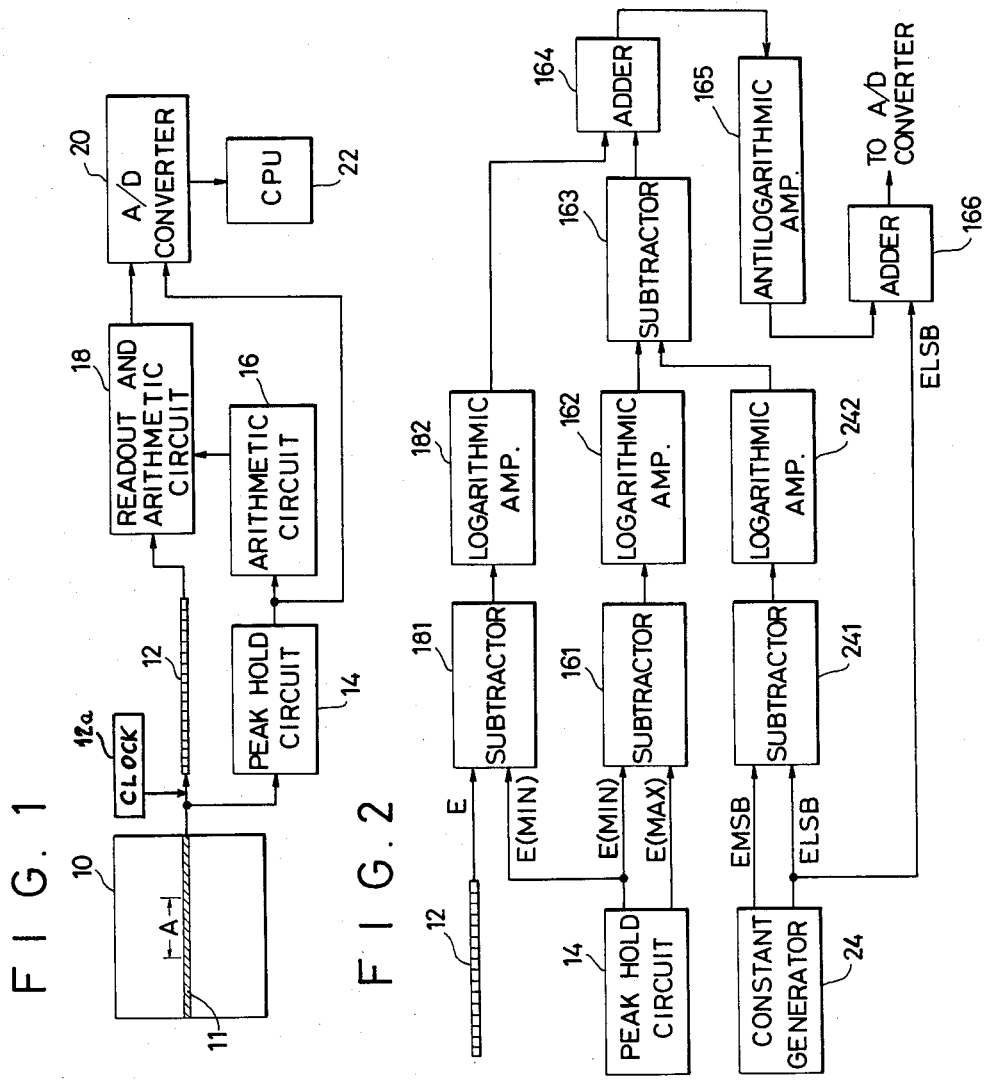

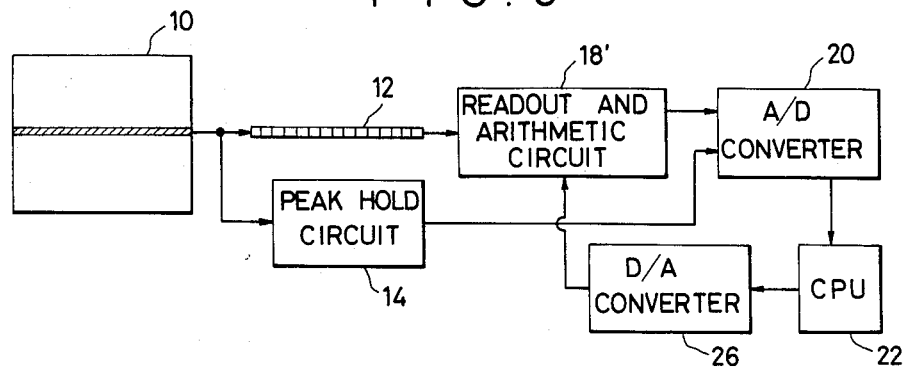
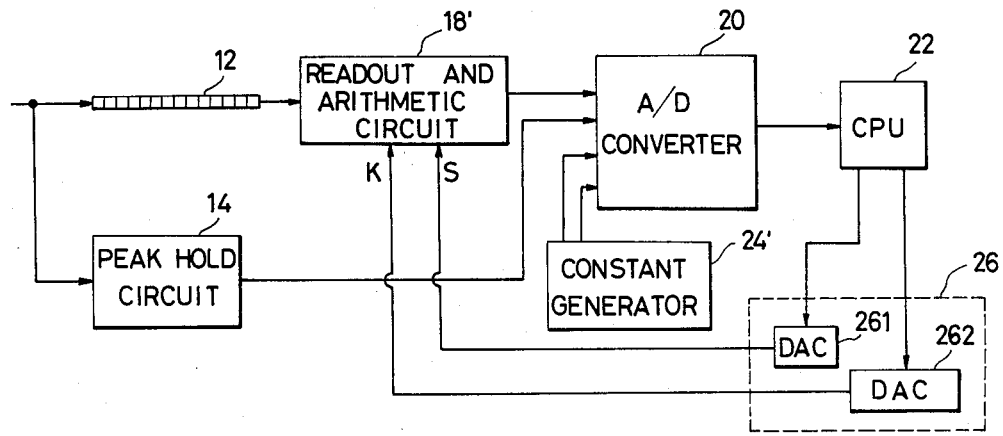
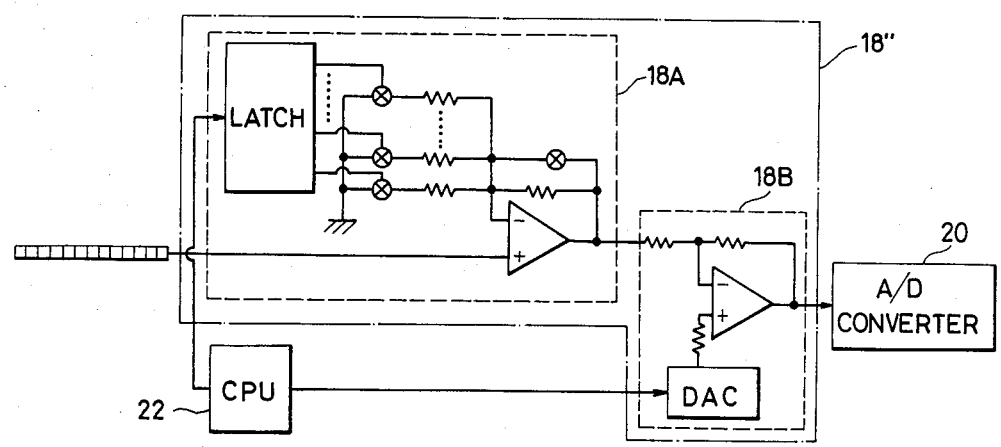

METHOD OF EXTRACTING AUTOMATIC-FOCUSING INFORMATION

BACKGROUND OF THE INVENTION

The present invention relates to a method of extracting automatic-focusing information utilized for automatically focusing a focusing lens system in a photographic camera or a video camera.

There are well known in the art automatic focusing methods for extracting automatic-focusing information from a video signal generated by an image sensor or an imager and for adjusting a focusing lens system based on the extracted automatic-focusing information for automatically focusing the focusing lens system.

The automatic-focusing information is normally extracted from one line of an output signal produced by the image sensor. The output signal may not necessarily be of a sufficient amplitude at all times since the output signal tends to vary dependent on the conditions of an object being photographed or imaged. If an output signal of a small amplitude from the imager were converted to a digital signal, the digital signal would contain certain indefinite elements not effective to perfect arithmetic operations required for automatically focusing the focusing lens system because the information contained in the digital signal would be insufficient, resulting in a malfunction of the focusing lens system.

One conventional solution has been to employ more lines over the output signal for extracting automatic-focusing information and then to add the respective pieces of information from the lines in an analog manner. In this prior process, the number of lines for extracting automatic-focusing information is increased to accumulate focusing signals when the contrast of the object is lowered to reduce the amplitude of the output signal from the imager. Therefore, the area in which to extract the automatic-focusing information is widened, and the information is apt to be affected by a larger-size object present in the area. This is problematic in that the focusing lens system finds difficulty in focusing on a smaller object in the area. Stated otherwise, the larger object in the area produces more automatic-focusing information than the smaller object in the area does. Consequently, when there are larger and smaller objects close to each other in one area, the focusing lens system is likely to be focused on the larger object.

Performing the foregoing process requires a substantial area of the imager to be used for processing output signals for extracting automatic-focusing information. This automatic-focusing process is not suitable for extracting automatic-focusing information for relatively small objects, and tends to be influenced by an object which takes up a larger area on the imaging surface.

The foregoing conventional process cannot be relied on in the case where the imager is a one-dimensional image sensor.

SUMMARY OF THE INVENTION

It is an object of the present invention to provide a method of extracting automatic-focusing information effectively from one line of an output signal generated by an image sensor or imager even when the output signal has a small amplitude.

According to the present invention, at least a portion of one line of an output signal from an image pickup means is stored in a delay line, and maximum and minimum values of the output signal are detected. The image pickup means may comprise a two-dimensional image sensor such as an area sensor or an image pickup tube, or a one-dimensional image sensor such as a CCD or a BBD. The delay line is an analog delay line which may comprise a CCD or a BBD. Then, a coefficient is computed for shifting the minimum value to a least significant bit in an A/D converter and the maximum value to a most significant bit in the A/D converter. The stored signal is read out of the delay line, amplified by the coefficient, and converted to a digital signal representative of automatic-focusing information.

Since at least a portion of one line of the output signal from the image pickup means is amplified so as to match the least and most significant bits in the A/D converter and then converted thereby to a digital signal, an appropriate signal indicative of automatic-focusing information can be obtained even if the output signal has a small amplitude. The automatic-focusing information can be extracted by using at least a portion of one line of the output signal from the image pickup means, with the result that the method of the invention can be used with one-dimensional image pickup means. The coefficient utilized as the amplification factor of the amplifier tends to be larger as the difference between the maximum and minimum values of the output signal becomes smaller. Inasmuch as the amplifier has a limited amplification capacity, the processing of the signal for extracting automatic-focusing information should be interrupted when the coefficient becomes larger than the amplification factor of the amplifier.

When storing the output signal from the image pickup means into the delay line, a clock frequency for driving the delay line (see clock 12a in FIG. 1) is selected to be equal to a scanning frequency for the image pickup means, and when reading the stored signal out of the delay line, the clock frequency is selected to be a relatively low frequency dependent on the rate of conversion in the A/D converter. With this arrangement, the overall system including the A/D converter and a CPU for processing the signal to extract automatic-focusing information can be rendered compact and lower in electric power consumption.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a block diagram of a device for carrying out a method of extracting automatic-focusing information according to an embodiment of the present invention;

FIG. 2 is a block diagram of a detailed circuit arrangement in the device shown in FIG. 1;

FIG. 3 is block diagram of a device for carrying out a method of extracting automatic-focusing information according to another embodiment of the present invention; and FIGS. 4 and 5 are block diagrams of detailed circuit arrangements in the device illustrated in FIG. 3.

DESCRIPTION OF THE PREFERRED EMBODIMENTS

FIG. 1 shows a device incorporated in a video camera for extracting automatic-focusing information. An imager or image sensor has a two-dimensional image pickup area 10, the image sensor comprising an area sensor in the illustrated embodiment though it may be an image pickup tube, a CCD (Charge-Coupled Device), or a BBD (Bucket-Brigade Device). The area sensor includes a row 11 of photodetector elements for producing one line of an automatic-focusing signal. The row 11 of photodetector elements is positioned substantially centrally in the vertical direction since the image of an object tends to be normally positioned vertically centrally on the image pickup area 10.

An output signal (voltage signal) E generated by the area sensor from the line 11 is commensurate with the distribution of light intensities on the line 11. The signal E as it is issued is applied to a delay line 12 and a peak hold circuit 14. The delay line 12 may comprise a CCD or a BBD, but comprises a CCD in the illustrated embodiment. The signal E applied to the delay line 12 is stored therein.

When the signal E is applied to the peak hold circuit 14, the peak hold circuit 14 holds a maximum value E(MAX) and a minimum value E(MIN) of the signal E. Therefore, the maximum and minimum values of the signal E are detected. Thus, the signal E is stored in the delay line 12 and the maximum and minimum values of the signal E are detected at the same time.

The detectd maximum and minimum values E(MAX), E(MIN) are impressed by the peak hold circuit 14 on an arithmetic circuit 16 and simultaneously converted by an A/D converter 20 to corresponding digital signals, which are delivered to a central processing unit (CPU) 22 that stores the digital equivalents of the voltage signals E(MAX), E(MIN).

The arithmetic circuit 16 computes a coefficient in the following manner:

$$K = \frac{EMSB - ELSB}{E(MAX) - E(MIN)}$$

where ELSB is the voltage at the LSB (least significant bit) of the A/D converter 20 and EMSB is the voltage at the MSB (most significant bit) of the A/D converter 20. The computed coefficient K is then applied to a readout and arithmetic circuit 18.

The readout and arithmetic circuit 18 is capable of reading out the signal E stored in the delay line 12 and performing a prescribed arithmetic operation. More specifically, when the coffeficient K is applied to the readout and arithmetic circuit 18, the circuit 18 reads the signal E out of the delay line 12 and processes the signal E according to the following equation:

$$K(E-E(MIN))+ELSB=Eo$$

The signal indicated by Eo is issued from the circuit 18. The signal Eo is representative of EMSB and ELSB when the signal E is E(MAX) and E(MIN), respectively. Stated otherwise, the coefficient K computed by the arithmetic circuit 16 serves to shift E(MIN) and E(MAX) to ELSB and EMSB, respectively, and is the amplification factor of the circuit 18.

The signal Eo indicative of automatic-focusing information is amplified by the circuit 18 so that it most matches the A/D converter 20. The automatic-focusing signal Eo is converted by the A/D converter 20 to a corresponding digital signal which is fed to the CPU 22 that carries out an arithmetic operation required to automatically focus a focusing lens system on the object.

The arithmetic circuit 16 and the circuit 18 shown in FIG. 1 are illustrated in greater detail in FIG. 2. A constant generator 24 which may comprise a variable resistor, for example, generates EMSB and ELSB and applies them to a subtractor 241 which computes their difference (EMSB−ELSB).

The peak hold circuit 14 applies E(MAX), E(MIN) to a subtractor 161 and applies E(MIN) to a subtractor 181 to which the signal E is also applied from the delay line 12. The subtractors 161, 181 computes the differences (E(MAX)−E(MIN)), (E−E(MIN)), respectively.

The output signals (E−E(MIN)), (E(MAX)−E(MIN)), and (EMSB−ELSB) respectively from the subtractors 181, 161, 241 are then applied to logarithmic amplifiers 182, 162, 242, respectively, which convert the applied signals to log(E−E(MIN)), log(E(MAX)−E(MIN)), and log(EMSB−ELSB), respectively. These converted signals are processed by a subtractor 163 and an adder 164 which produces a signal represented by:

$$\log \frac{(EMSB - ELSB)}{(E(MAX) - E(MIN))} (E - E(MIN))$$

This output signal from the adder 164 is then applied to an antilogarithmic amplifier 165 which generates a signal indicated by:

$$\frac{EMSB - ELSB}{(E(MAX) - E(MIN))} (E - E(MIN))$$

An adder 166 adds ELSB to this signal to generate the output signal Eo.

While in the foregoing embodiment one line of an output signal from the area sensor is employed for extracting automatic-focusing information, the automatic-focusing information may be extracted from a portion A of the line. According to this alternative, only the output signal from the line portion A may be applied to the delay line 12 and the peak hold circuit 14.

FIG. 3 shows a device incorporated in a video camera for effecting a method according to another embodiment of the present invention. For the sake of brevity, like or corresponding parts in FIG. 3 are denoted by like or corresponding reference characters in FIG. 1. The device of FIG. 3 includes a readout and arithmetic circuit 18'. Signal values E(MAX), E(MIN) detected by the peak hold circuit 14 are converted by an A/D converter 20 to digital signals. The A/D converter 20 is supplied with ELSB, EMSB from a constant generator 24' which (see FIG. 4) may comprise a variable resistor. These data items E(MAX), E(MIN), ELSB, EMSB are then fed to a CPU 22 which computes a coefficient K and a shift S as follows:

$$K = \frac{EMSB - ELSB}{E(MAX) - E(MIN)}$$

$$S = ELSB - KE(MIN)$$

The computed K and S are then applied to a D/A converter 26. As illustrated in FIG. 4, the D/A converter 26 has a pair of D/A converter units 261, 262. The shift S is converted by the D/A converter unit 261 to an analog quantity which is applied to the readout and arithmetic circuit 18', and the coefficient K is converted by the D/A converter unit 262 to an analog quantity which is applied to the readout and arithmetic circuit 18'.

In response to the analog signals K and S, the readout and arithmetic circuit 18' reads the stored signal E from the delay line 12, amplifies the signal E by an amplification factor equal to the coefficient K into a signal KE, and adds the shift S to the signal KE to issue a signal indicated by:

$$KE + S = Eo'.$$

Since $S = ELSB - KE(MIN)$, $Eo'$ is equal to $K(E - E(MIN)) + ELSB$ which is the same as the output signal Eo from the readout and arithmetic circuit 18 in the embodiment shown in FIG. 1.

The output signal Eo' or automatic-focusing signal is then converted by the A/D converter 20 to a digital signal that is fed to the CPU 22 which processes the supplied signal to effect an arithmetic operation required for automatically focusing the focusing lens system.

FIG. 5 shows, by way of example, a detailed circuit arrangement for a circuitry 18" in the readout and arithmetic circuit 18'. The circuitry 18" includes a circuit section 18A for amplifying the signal E read out of the delay line 12, and a circuit section 13B for adding the amplified signal from the circuit section 18A and the shift S from the CPU 22.

Although certain preferred embodiments have been shown and described, it should be understood that many changes and modifications may be made therein without departing from the scope of the appended claims.

What is claimed is:

1. A method of extracting automatic-focusing information, comprising:
    (a) storing in a delay line at least a portion of one line of an output signal from image pickup means to thereby form a stored signal readable out of said delay line;
    (b) detecting maximum and minimum values of said output signal;
    (c) computing a coefficient for shifting said minimum value to a least significant bit in an A/D converter and said maximum value to a most significant bit in the A/D converter;
    (d) reading the stored signal out of said delay line to thereby provide a read signal;
    (e) amplifying the read signal by said coefficient to thereby provide an amplified signal; and
    (f) converting the amplified signal to a digital signal representative of automatic-focusing information.

2. A method according to claim 1, wherein said image pickup means comprises an area sensor or an image pickup tube.

3. A method according to claim 1, wherein said image pickup means comprises a CCD or a BBD.

4. A method according to claim 1, wherein said one line comprises a line disposed substantially centrally on an image pickup area of said image pickup means.

5. A method according to claim 1, wherein said delay line comprises a CCD or a BBD.

6. A method according to claim 1, wherein said one line of the output signal from said image pickup means is entirely stored in said delay line.

7. A method according to claim 1, wherein only a portion of said one line of the output signal from said image pickup means is stored in said delay line.

8. A method according to claim 1, wherein a clock frequency for driving said delay line is equal to a scanning frequency for said image pickup means when storing the signal into said delay line, and said clock frequency is selected to be a relatively low frequency dependent on the rate of conversion in said A/D converter when reading the stored signal out of said delay line.

* * * * *

UNITED STATES PATENT AND TRADEMARK OFFICE
CERTIFICATE OF CORRECTION

PATENT NO. : 4,615,598
DATED : October 7, 1986
INVENTOR(S) : Shinichirou KOSHIISHI It is certified that error appears in the above-identified patent and that said Letters Patent are hereby corrected as shown below:

On the cover page, in the left-hand column, after the inventor's name and address, insert:

--[73] Assignee: Ricoh Company, Ltd., Tokyo, Japan--.

On the cover page, in the right-hand column, after the name of the Primary Examiner, insert:

--Attorney, Agent, or Firm - Cooper & Dunham--.

Signed and Sealed this

Seventh Day of June, 1988

Attest:

DONALD J. QUIGG

Attesting Officer

Commissioner of Patents and Trademarks